United States Patent
Payne

(10) Patent No.: US 10,789,052 B2
(45) Date of Patent: Sep. 29, 2020

(54) USER INTERFACE (UI) DESIGN SYSTEM MAPPING PLATFORM FOR AUTOMATICALLY MAPPING DESIGN SYSTEM COMPONENTS TO A DESIGN DOCUMENT FILE FROM A DESIGN TOOL TO GENERATE A MAPPED SPECIFICATION

(71) Applicant: salesforce.com, inc., San Francisco, CA (US)

(72) Inventor: Derek Payne, Greenwood, IN (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/173,967

(22) Filed: Oct. 29, 2018

(65) Prior Publication Data
US 2020/0133642 A1    Apr. 30, 2020

(51) Int. Cl.
*G06F 3/00*     (2006.01)
*G06F 8/38*     (2018.01)
*G06F 3/0484*   (2013.01)
*G06F 3/01*     (2006.01)

(52) U.S. Cl.
CPC ............ *G06F 8/38* (2013.01); *G06F 3/04847* (2013.01)

(58) Field of Classification Search
CPC ................................ G06F 8/38; G06F 3/04847
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,119,152 A * | 9/2000 | Carlin ................ G06Q 30/02 709/217 |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Nicholas Augustine
(74) *Attorney, Agent, or Firm* — LKGlobal | Lorenz & Kopf, LLP

(57) ABSTRACT

A user interface (UI) design system mapping platform is provided that can receive and process a design document file and a library file to automatically generate a mapped specification that maps the design document file to the library file. The library file can be generated at a design system and includes design system components for development reuse and their definitions. The design system components can be assembled, via an external design tool, to build user interfaces, applications or layouts. The design document file can be imported from the design tool to the UI design system mapping platform. The design document file is generated based on selected ones of the design system components and includes various design artifacts including layout and assets that describe a user interface of an application.

17 Claims, 6 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,006,177 B1* | 8/2011 | Meltzer .................. G06Q 10/06 715/234 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0096041 A1* | 4/2012 | Rao .................. G06F 16/337 707/794 |
| 2012/0102402 A1* | 4/2012 | Kwong .................. G06Q 50/01 715/705 |
| 2012/0130973 A1* | 5/2012 | Tamm .................... G06Q 10/00 707/706 |
| 2012/0218958 A1 | 8/2012 | Rangaiah |
| 2012/0233137 A1 | 9/2012 | Jakobson et al. |
| 2012/0278725 A1* | 11/2012 | Gordon ............ H04N 21/25891 715/738 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0092179 A1* | 3/2016 | Straub ...................... G06F 8/20 717/107 |
| 2016/0092336 A1* | 3/2016 | Atanasiu ............ G06F 11/3636 717/133 |
| 2016/0092499 A1* | 3/2016 | Leigh ...................... G06F 8/34 707/740 |
| 2018/0181378 A1* | 6/2018 | Bakman .................. G06F 8/34 |
| 2018/0217722 A1* | 8/2018 | Venkataraman .... G06F 3/04847 |

(56) References Cited

U.S. PATENT DOCUMENTS

\* cited by examiner

USER INTERFACE (UI) DESIGN SYSTEM MAPPING PLATFORM FOR AUTOMATICALLY MAPPING DESIGN SYSTEM COMPONENTS TO A DESIGN DOCUMENT FILE FROM A DESIGN TOOL TO GENERATE A MAPPED SPECIFICATION

TECHNICAL FIELD

Embodiments of the subject matter described herein relate generally to documenting how to implement a design system within a designed layout during development. More particularly, embodiments of the subject matter relate to a User Interface (UI) design system mapping platform for automatically mapping design system components to a design document file from a design tool to automatically generate a mapped specification.

BACKGROUND

User Interface (UI) design is the discipline of designing software interfaces for devices, ideally with a focus on maximizing efficiency, responsiveness and aesthetics to foster a good user experience. UI design is typically employed for products or services that require interaction for the user to get what they need from the experience. The interface should allow a user to perform any required tasks to complete the function of the product or service. An interface is a point of interaction between the user and the hardware and/or software they are using. A UI designer is someone who creates the user interface based on a functional requirement and planned user experience using design standards and aesthetics to craft a certain experience. UI design can be done using computer visualization software or by building directly in code.

A design tool is software that can be used for creating the UI of a software application. A design tool provides features that help in the prototyping of a software application, and the level of prototype fidelity depends on the features provided by the tool. A design tool helps in visualizing the look and feel of an application and is used by designers to determine requirements and/or obtain feedback from users. A design tool can be used to create a user interface (UI) layout, graphics design, sketches and mockups. Some design tools are also capable of generating code from the UI design that has been created, or to create templates for websites and generic applications.

A UI design system can refer to complete set of design standards, documentation, and principles along with the toolkit (UI patterns and code components) to achieve those standards. A design system can include many reusable components that can be assembled together to build any number of applications. Design systems help teams by giving them a more structured and guided way to build solutions for their product problems, which helps translate a consistent experience and visual language across a product when working on different touch-points.

Once a design system is created, a designer will use the design tool and predefined design system components to build a layout. While a design document specifies a layout, it does not include any information about how the design system components are being used to produce that layout. One drawback of commonly used design tools and systems is that the designer has to manually add definitions to the design document regarding how to implement the design system within the designed layout during development so that developers can use these as a guide during code development. In other words, once layouts are built within the design tool, the designer must manually compare and specify usage characteristics based on the design system, in relation to how they are implemented within the designed layout. These manual definitions are then submitted to developers who can use these as a guide during code development. This manual editing process is very time-consuming and inefficient for designers, and for that reason, among others, it would be desirable to make the process of generating accurate documentation easier and more efficient.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

A user interface (UI) design system mapping platform is provided that can receive and process a design document file (from a design tool) in conjunction with a library file (from a design system) to automatically generate a mapped specification that maps the design document file to the library file. The library file can be generated at the design system and includes design system components for development reuse and their definitions. The design system components can be assembled, via an external design tool, to build user interfaces, applications or layouts. The design document file can be imported from the design tool to the UI design system mapping platform. The design document file uses naming conventions and patterns of the UI design system mapping platform. The design document file is generated based on selected ones of the design system components. The design document file includes various design artifacts including: layout and assets that describe a user interface of an application. The layout comprises information or elements that define a structure for a user interface, and the assets are resources or components used to implement a design artifact in the user interface.

The UI design system mapping platform can automatically map certain ones of the design system components from the library file to corresponding ones of the design artifacts of the design document file to generate the mapped specification. The UI design system mapping platform can interpret layout organization specified by the design document file to setup naming and ordering of: layers, groups and names within the design document file, and directly map the naming and the ordering to the certain ones of the design system components.

The mapped specification includes naming conventions of the design system. The mapped specification is a visualized representation with instructions that directly match the design system components to the layout and assets specified in the design document file. The mapped specification provides a visual indication of how to implement the design system components within the layout specified in the design document file during development of the user interface of the application.

Viewed in a different way, the disclosed embodiments can be seen as a system that includes a design system that stores design system components for development reuse and their definitions in a library file (e.g., so the design system components can be assembled to build user interfaces, applications or layouts), a design tool that accesses the design system to generate the design document file based on selected ones of the design system components, the UI design system mapping platform, and possibly a development platform. Having provided that general, non-limiting description of the disclosed embodiments further details will now be described with reference to FIGS. 1-6.

Figure 1:
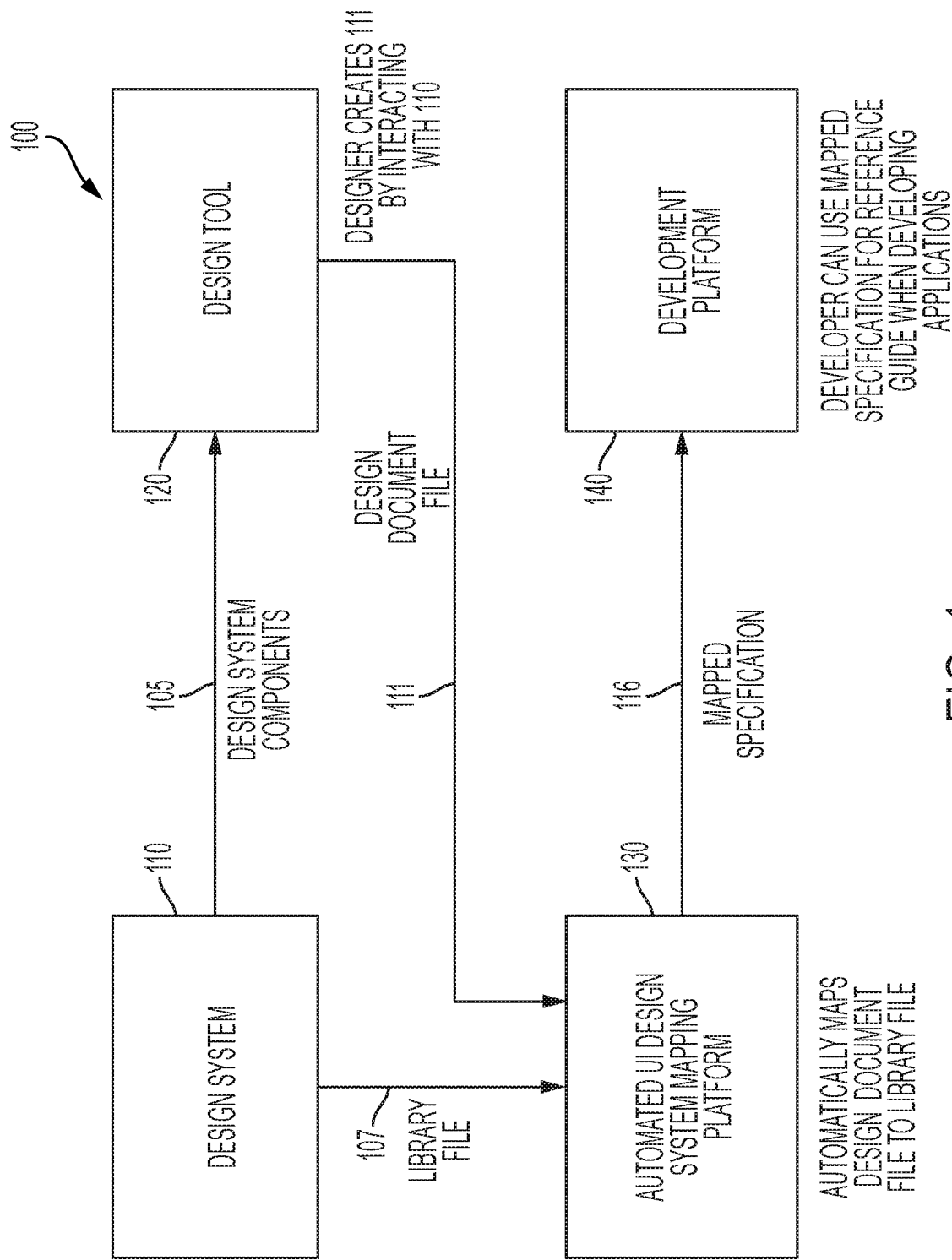
FIG. 1 is a system for automatically mapping design system components to a design document file to automatically generate a mapped specification in accordance with the disclosed embodiments.

FIG. 1 is a system 100 for automatically mapping design system components to a design document file to automatically generate a mapped specification in accordance with the disclosed embodiments. The system 100 includes a design system 110, a design tool 120, a user interface (UI) design system mapping platform 130, and a development platform 140.

The design system 110 is a repository that stores a collection of reusable, design system components, UI design patterns and principles for development reuse, guided by clear standards, that can be assembled to craft and build any number of user interfaces, applications or layouts. The design system 110 can refer to complete set of design standards, documentation, and principles along with the toolkit (UI design patterns and code components) to achieve those standards. The design system 110 can be shared and used by many different designers and developers.

In general terms, design system components and their definitions can include many different types of standardized components, assets, utilities, tokens (e.g., fonts, colors), icons, buttons, input controls, navigation elements, variations, etc. User interface design patterns are descriptions of best practices within user interface design. They are general, reusable solutions to commonly occurring problems. As such, they form the backbone of "technical support." However, as design patterns can be applied to a wide variety of instances, designers should adapt them to the specific context of use within each design project. A UI design pattern can include things, such as, the usability problem faced by the user when using the system; context of use (e.g., the situation giving rise to the usability problem in terms of the tasks, users, and context of use); one or more design principles (e.g., error management or the consistency of user guidance); a proven solution to the core of the problem; a description of how and why the pattern actually works, including an analysis of how it may affect certain attributes of usability; examples where each example shows how the pattern has been successfully applied in a real-life system, each example can be accompanied by a screenshot and short description; and implementation details Common examples of commercially available design systems can include Salesforce.com's Lightning Design System® (SLDS), Microsoft Fluent®, Google Material®, etc. For example, Salesforce.com's Lightning Design System® reflects the patterns and components that underpin the Salesforce product. It includes brand and product design guidelines, design patterns and component blueprints for creating unified UI in the Salesforce ecosystem. A design pattern refers to principle-driven guidelines of a repeatable experience. Components are the building blocks of applications, enabling designers and developers with ready-to-go interface elements available in HTML and CSS code, or in Sketch Templates. Component blueprints are framework agnostic, accessible HTML and CSS used to create components in conjunction with implementation guidelines. A component blueprint includes pre-production markup (e.g., the markup on the SLDS website), production CSS, and interaction guidelines: including desired component lifecycle, mouse and keyboard interaction, accessibility guidelines and JS guidelines. Lightning Components can refer to a functional, reusable component built on the Lightning platform. These can include base Lightning components (e.g., a programmatic component, built according to the SLDS Component Blueprint, without logic or functionality); experience Lightning components (e.g., a functional, declarative or programmatic component, built from base Lightning components); and custom Lightning components (e.g., a functional, reusable component built on the Lightning platform, with or without base or experience components). Utility classes allow developers to apply a single rule or simple pattern to your components. Design tokens are named entities that store visual design attributes. They can be used in place of hard-coded values (such as hex values for color or pixel values for spacing) in order to maintain a scalable and consistent visual system for UI development.

These patterns and components provide a unified language and consistent look and feel when designing apps and products within the Salesforce ecosystem. The Lightning Design System enables designers to build rich enterprise experiences and custom applications with the patterns and established best practices that are native to Salesforce. The Lightning Design System provides accessible markup which will serve as a foundation for application development.

The design tool 120 is a software-based system (e.g., computer program) that executes at one or more hardware-based processors. The design tool 120 may be a web-based plugin, an application, or a service depending on the implementation. The design tool 120 provides features that help in the prototyping of a software application, and can be used for example, to create, the user interface of a software application. It helps in visualizing the look and feel of an application and is used by designers to determine requirements and obtain feedback from users.

The design tool 120 can be used, for example, by a UI designer to create a user interface (UI) layout, graphics design, sketches and mockups using components of the design system 110. The design tool 120 is used to coordinate, create and build design artifacts with the goal of producing mockups, concepts and layouts that influence the perception of design ideas. A design artifact can be any sort of deliverable needed in the design process, such as, a mockup of a UI, an interaction, a prototype, a pattern, a defined layout and more. Some interface design tools are also capable of generating code from the UI design that has been created. Some tools can also be used to create templates for websites and generic applications. The design system 110 can be a proprietary or company branded design system. Common examples of commercially available design tools 120 can include Adobe Photoshop®, Sketch®, Invision®, Illustrator®, etc.

Once a design system 110 is created, a designer will use the design tool 120 and pre-defined design system components 105 to build a layout and assets. The design document file 111 is a file that specifies a layout and assets, but does not include any information about how the design system components 105 are being used to produce that layout. One drawback of commonly used design tools and systems is that the designer has to manually add definitions to the design document regarding how to implement the design system components within the designed layout during development so that engineers or developers can use these as a guide during code development. In other words, once layouts are built within the design tool, the designer must manually compare and specify usage characteristics based on the design system, in relation to how they are implemented within the designed layout. These "usage characteristics" are the specific details that define how to implement the layout. For example, it can be the particular font, color, size, spacing or connection a particular item has in the layout. These manual definitions are then submitted to engineers or developers, who can then use these as a guide during code development. This manual editing process is very time-consuming and inefficient for designers. This manual editing process is a tedious, time-consuming job that wastes the designer's time, but is currently the only way to translate everything between what is output by the design tool and how that relates back to the way things are defined in the design system, which developers need to know. It would be desirable to make the process of generating accurate documentation easier and more efficient.

To address these issues, the disclosed embodiments provide the UI design system mapping platform 130 that is used to automatically generate "mapped specifications" of design system usage and implementation. As used herein, a "mapped specification" refers to documentation with assigned mappings that directly map usage of design system components and definitions for the design system components (from a library file 107 provided from the design system 110) to layout and assets from the design document file 111 (generated by the design tool 120) to reference unique variables, tokens, definition of assets, etc. The mapped specification 116 includes the mappings created by the UI design system mapping platform 130 and presents them as a new document. The mapped specification can be in many different formats or file types, such as, a web page, a PDF document, and other file types. The UI design system mapping platform 130 can allow a designer to quickly map and spec design usage characteristics among areas in the designed layout automatically and dynamically to design system components (e.g., pre-defined live development assets) in the library file 107 (or "configured design system library definition"). As such, the designer can easily generate the mapped specification with accurate documentation that describes how to implement the design system within the designed layout during development. The UI design system mapping platform 130 can also allow intelligent interpretation of design document file 111 and accompanying design tool layout organization (e.g., to setup naming and ordering layers, groups, names, etc. . . . within the design document file), and directly map those uses to design system components (e.g., assets) within the design system. This eliminates the need for manual documentation of design system usage, better prepares developers for UI design implementation by directly matching current design system components to the layout and assets specified in the design document file, and drastically reduces amount of time spent repeatedly documenting the same components/inventory over and over. In addition, it should be appreciated that the UI design system mapping platform 130 can be used in conjunction with any number of different design systems and in conjunction with any number of different design tools. The UI design system mapping platform 130 will be described in greater detail below with reference to FIGS. 2-5.

The development platform 140 (also referred to as a development environment) is a software-based system that executes at one or more hardware-based processors, and that is used by developers to develop code for applications or other computer programs. Developers who are using the development platform 140 can utilize one or more of the mapped specifications generated by the UI design system mapping platform 130 as a guide during code development.

Figure 2:
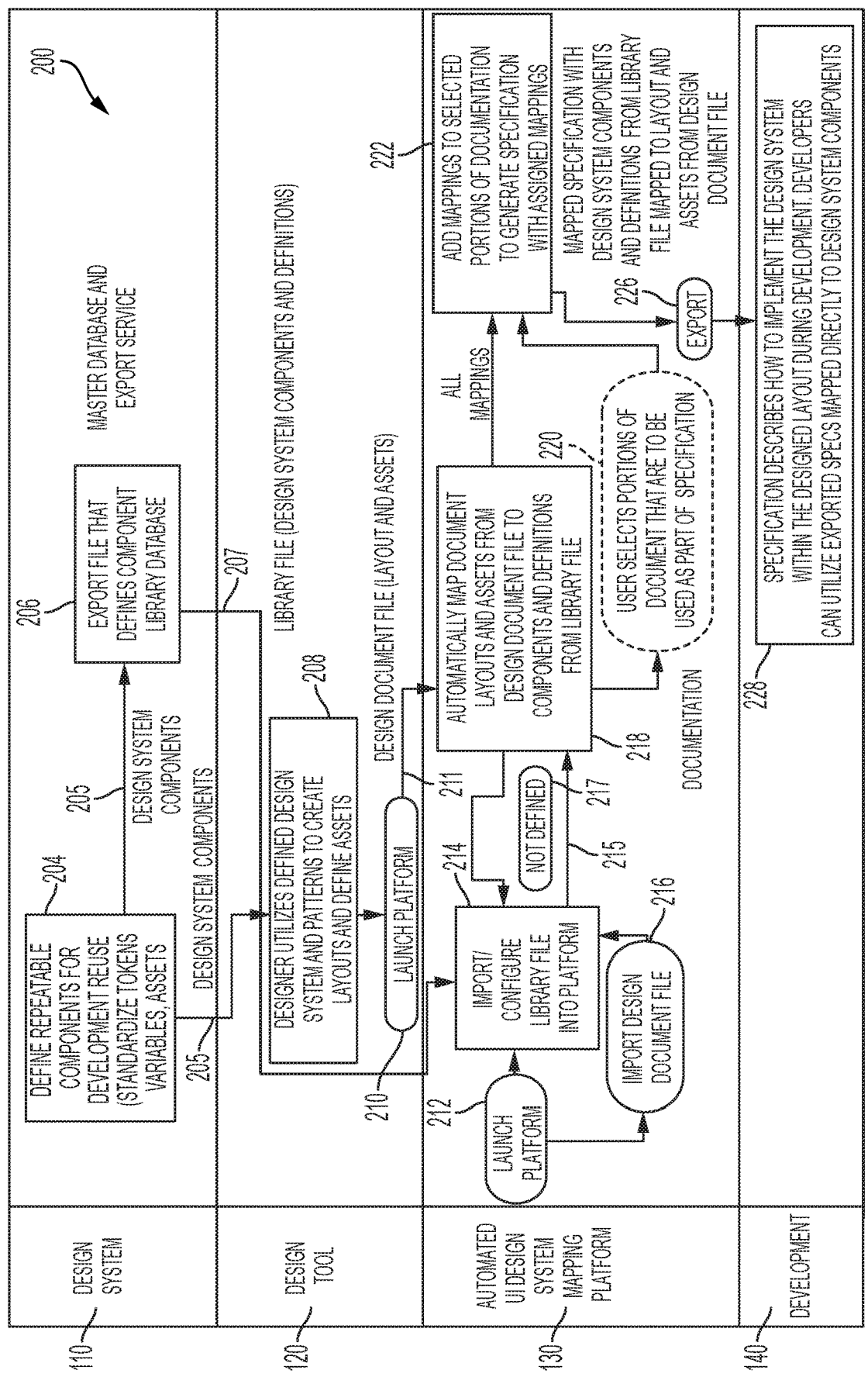
FIG. 2 is a flow diagram that illustrates a method for automatically mapping design system components to a design document file to automatically generate a mapped specification in accordance of the disclosed embodiments.

FIG. 2 is a flow diagram that illustrates a method 200 of operation of the system 100 to automatically map design system components to a design document file to automatically generate a mapped specification in accordance of the disclosed embodiments. The method 200 begins at 204 when a user of the design system 110 defines and standardizes repeatable design system components for development reuse. The standardized design system components can then be packaged and sent to the design tool 120 at 205. The design system 110 includes a master database 206 that includes an export service. The master database 206 stores all the design system components of the design system 110 and definitions for each. As will be explained in greater detail below, the export service can create a library file 207 that includes all of the design system components and definitions that are stored at the master database 206 at a particular time. The design system components and the corresponding definitions make up the library file 207. As used herein, the term "definitions" when used in conjunction with the term "library file" refers to characteristics of design system components.

The export service can provide the library file to the UI design system mapping platform 130. Depending on the implementation, this can be done, for example, when the designer launches the UI design system mapping platform 130 at 210, in which case the library file will be pushed to the UI design system mapping platform 130, or can be done when a user of the UI design system mapping platform 130 requests the library file from the export service.

The method 200 continues at 208, where the designer, who is using the design tool 120, utilizes the design tool 120 and components of the design system 110 to create a design document file using naming conventions and patterns of the design tool 120. As used herein, a "design document file" is a file that includes information about document layout (e.g., patterns to create layouts) and assets. As used herein, the term "document layout" when used in conjunction with the term "design document file" refers to information or elements that define the structure for a user interface. A few non-limiting examples of interface elements include but are not limited to: input controls (e.g., buttons, text fields, checkboxes, radio buttons, dropdown lists, list boxes, toggles, date field); navigational components (e.g., breadcrumb, slider, search field, pagination, slider, tags, icons); informational components (e.g., tooltips, icons, progress bar, notifications, message boxes, modal windows); containers (e.g., accordion), etc. As used herein, the term "asset" when used in conjunction with the term "design document file" refers to a resource or components that developers need in order to implement an artifact used in a UI and UX. A few non-limiting examples of UI design assets are color, palettes (codes), styles, icons, fonts, images, animation, audio, video and each and every other element that is used in visual design techniques.

When the designer is done creating the layouts and concepts of the design document, the designer can launch the UI design system mapping platform 130 (at 210) using, for example, an action button provided in via a UI of the design tool 120. When the designer launches the UI design system mapping platform 130 (at 210), the method 200 proceeds to 211, where the design document file is pushed to the UI design system mapping platform 130 from the design tool 120.

Alternatively, it should be noted that a user of the UI design system mapping platform 130 can also launch the UI design system mapping platform 130 (at 212) using, for example, an action button provided in via a UI of the UI design system mapping platform 130. At 212, a user of the UI design system mapping platform 130 can launch the UI design system mapping platform 130, which triggers to importation of one or more of the design document file and the library file. For example, when the user of the UI design system mapping platform 130 launches the UI design system mapping platform 130 (at 212), the method 200 proceeds to 216, where the design document file is pulled from the design tool 120 in response to a request from the UI design system mapping platform 130, and the library file is pulled from the export service (of the design system) in response to a request from the UI design system mapping platform 130.

Figure 3:
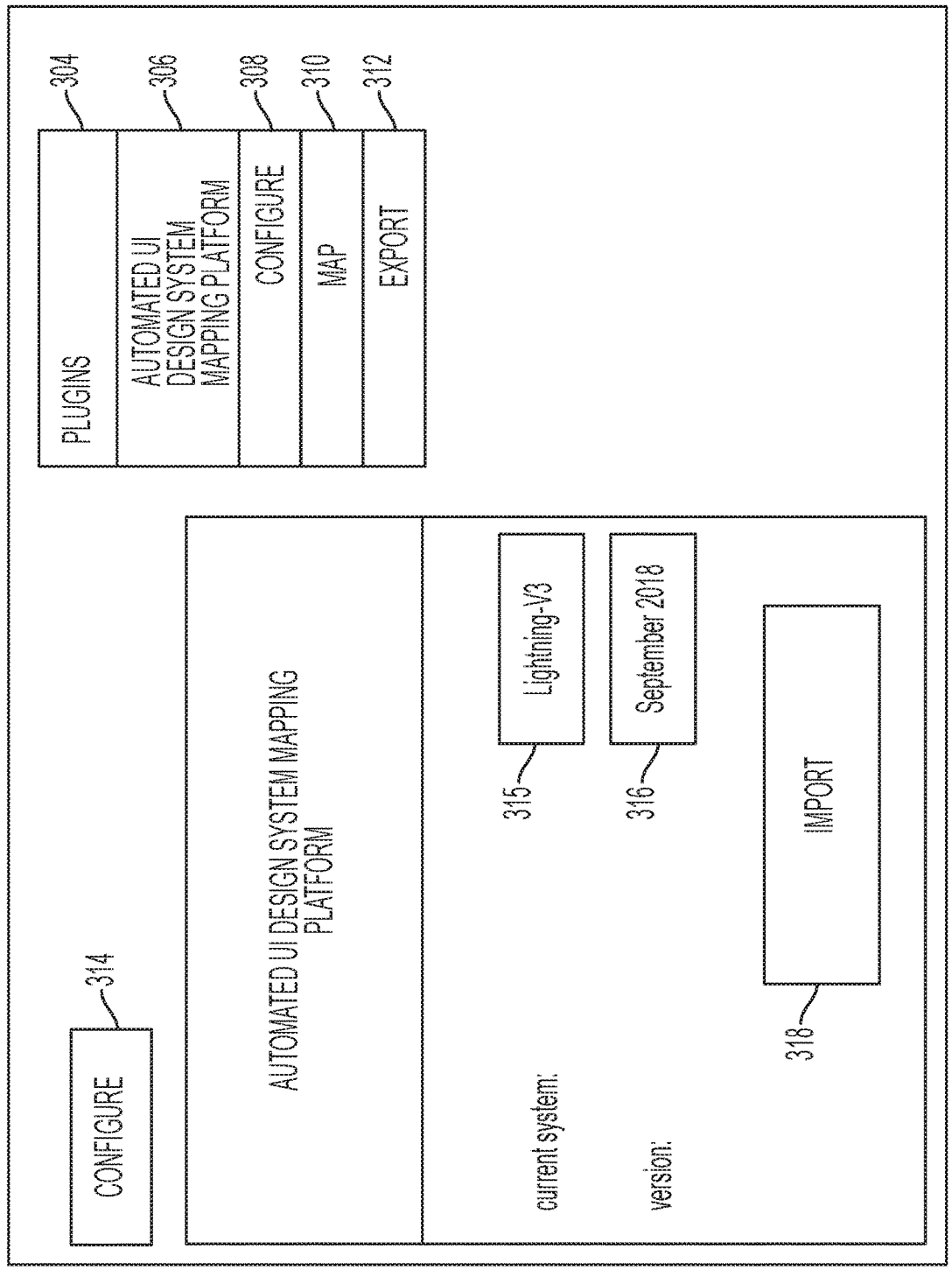
FIG. 3 illustrates an example of a graphical user interface that is presented after the UI design system mapping platform is launched in accordance with the disclosed embodiments.

FIG. 3 illustrates an example of a graphical user interface that is presented after the UI design system mapping platform 130 is launched in accordance with the disclosed embodiments. In one implementation, the UI design system mapping platform 130 can be implemented as browser plug-in; however, it should be appreciated that the UI design system mapping platform 130 could also be implemented as a standalone application or a service in other embodiments. In FIG. 3, the user/designer launches a plugin 304 for the UI design system mapping platform 130 by selecting button 306. This presents action buttons 308 for a number of options to the user: a configure action button 308 that allows the user to specify which design system to use by selecting a configure button 314, a map action button 310 which allows the user/designer to automatically map layouts and assets from the design document file 211 to available definitions from the library file, and an export action button 312 which allows the user/designer to export the mapped specification to developers at the development environment 140. The selected design system and its version number will be displayed at 315, 316, respectively. The import action button 318 allows the user/designer to import a particular library file that is to be used for mapping from the design system.

Regardless of the methodologies used to launch the UI design system mapping platform 130 and provide the library file and the design document file to the UI design system mapping platform 130, the other operational features of the UI design system mapping platform 130 will remain the same.

At process 214, the UI design system mapping platform 130 receives the library file from the design system 110, and at 215 provides the library file to process 218. The user of the UI design system mapping platform 130 can use the library file as is, or can configure as they desire, or as needed, before it is automatically mapped at process 218. The user may choose to configure certain features of the library file, or alternatively may be required (at 217) to configure certain features of the library file when adding new variations or components to the design system 110, or when there is a discrepancy within the mapped library file and how the mapping occurred.

At process 218, the UI design system mapping platform 130 automatically maps the design document file to the library file. For example, in one implementation, the UI design system mapping platform 130 automatically maps document layouts and assets from the design document file to design system components and definitions of the library file. It should be noted that prior to performing the automatic mapping at process 218, the user may optionally add something to the design document file before mapping it to the library file. After mapping at process 218, the UI design system mapping platform 130 outputs documentation that includes design system components mapped to document layout and assets.

Figure 4:
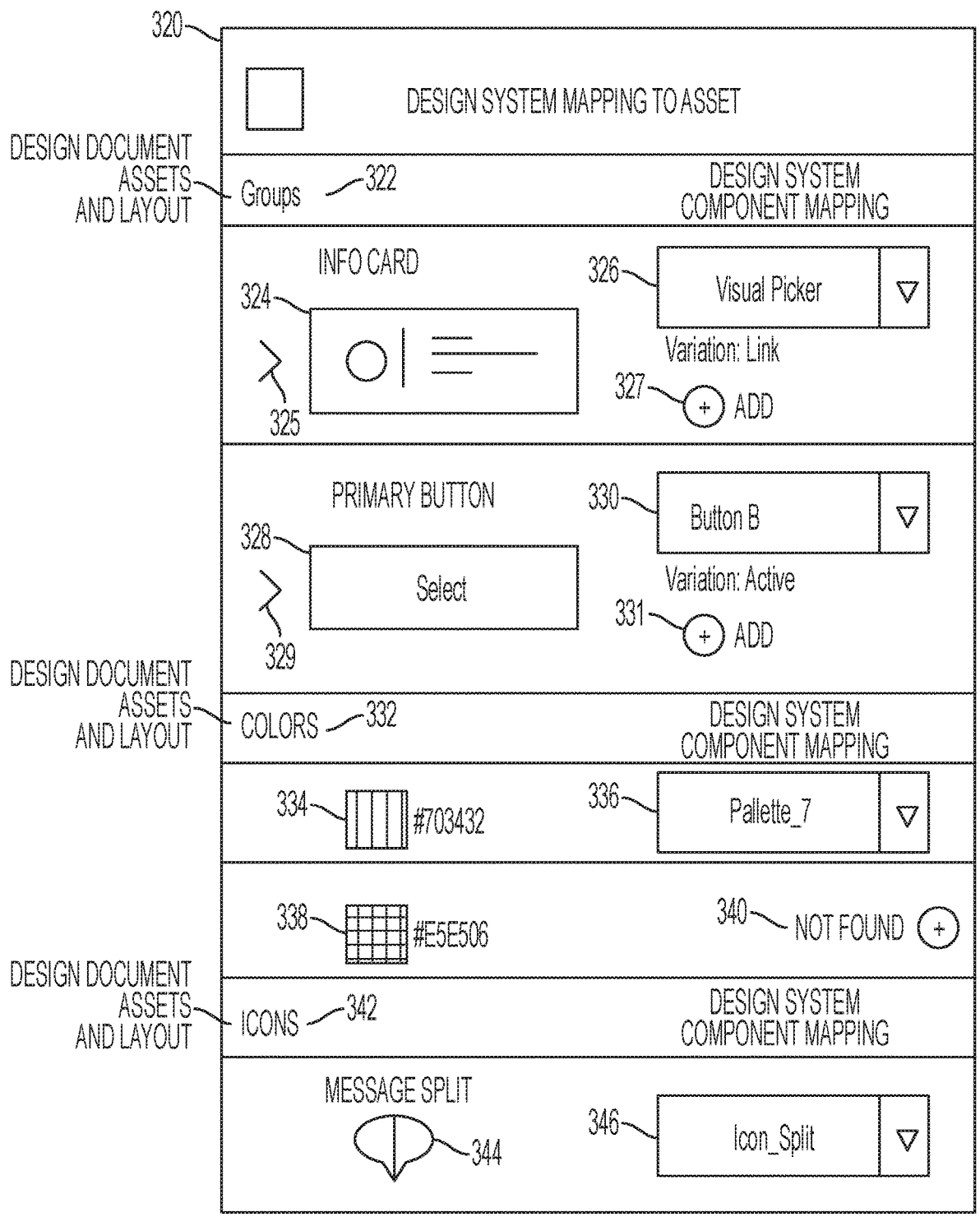
FIG. 4 illustrates an example of a graphical user interface that is presented after the UI design system mapping platform has performed mapping in accordance with the disclosed embodiments.

FIG. 4 illustrates an example of a graphical user interface 320 that is presented after the UI design system mapping platform 130 has performed mapping in accordance with the disclosed embodiments by selecting button 310 of FIG. 3. The graphical user interface 320 displays mapping between different classes of design document assets/layout and corresponding design system components for different types of assets/layout that are part of the design document file. In this simplified example, three types of assets are shown: groups 322, colors 332, and icons 342. The groups asset 322 includes an info card 324 having a corresponding design system component 326 (visual picker), and a primary button (select) 238 having a corresponding design system component 330 (Button B). The control 325 allows the asset to be expanded for nested groups meaning that deeper mapping can occur depending on what components may be included within the nested group. The add buttons 327, 331 can be used to choose an attribute of the corresponding design system component 326, 330. The colors asset 332 includes a color 334 (#7034B2) having a corresponding design system component 336 (Pallett 7), and a color 340 (#7034B2) which does not have a corresponding design system component 340 (NOT FOUND). This ensures proper use of what is in the design system. Also, if needed, can serve as a request or add to the system. The icons asset 342 includes a message split icon 344 having a corresponding design system component 346 (Icon_Split). As such, the interface 320 describes how the assets/layout maps to a corresponding design system component (if it does).

Referring again to FIG. 2, at 220, the user of the UI design system mapping platform 130 can choose which portions or parts of the design document file will be included as part of and used to generate the mapped specification. For example, in some cases the user may only want to choose part of the design document file to ultimately generate the mapped specification, whereas in other cases the user may want use the entire design document file to ultimately generate the mapped specification.

The method 200 then proceeds to 222 where the UI design system mapping platform 130 adds the system mappings to portions of the documentation selected by the user to generate/compile a mapped specification with the assigned mappings (i.e., specifications in which the layout/assets of the design document file have been mapped directly to the design system components and definitions of the library file 207).

Figure 5:
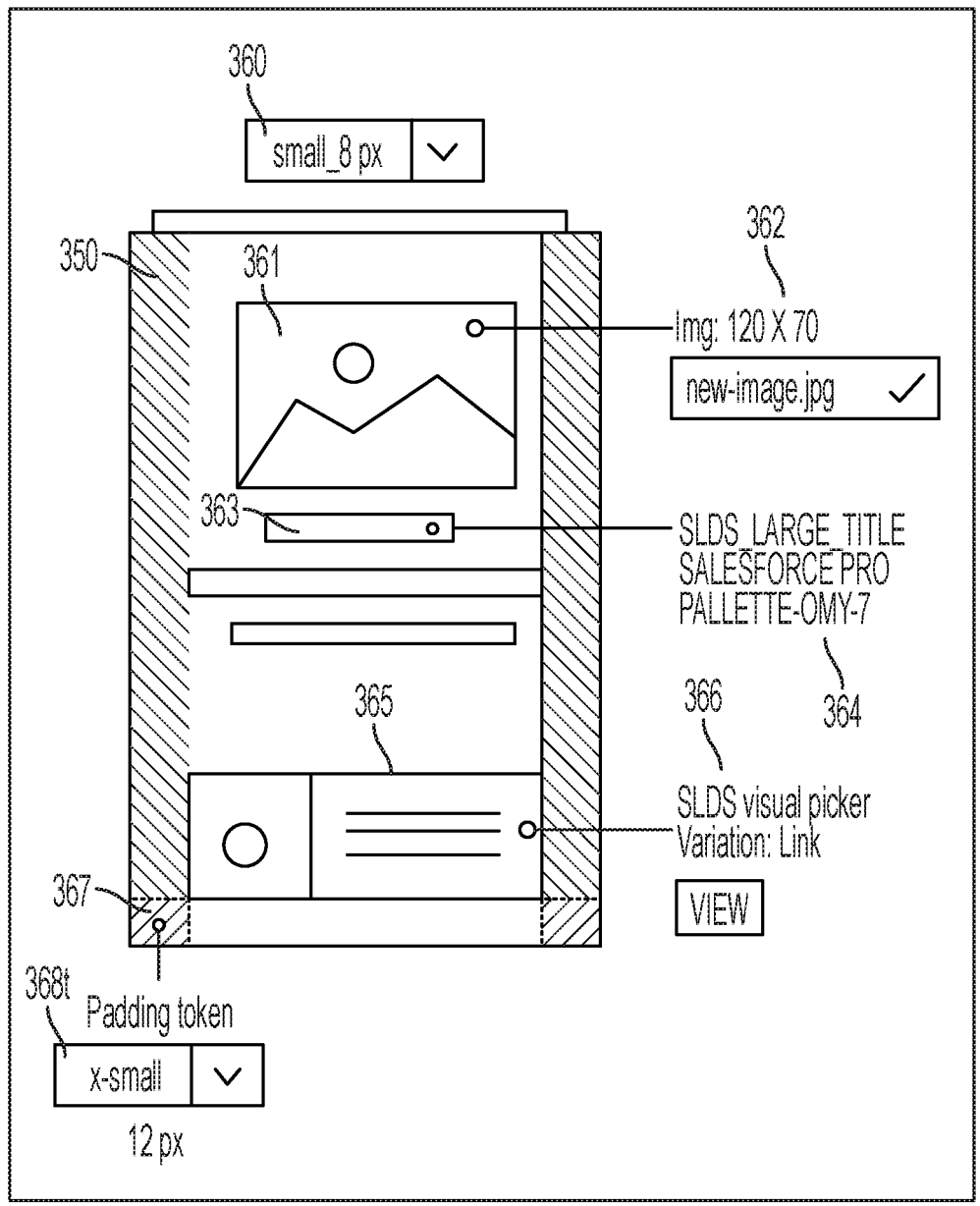
FIG. 5 illustrates another example of a graphical user interface used to present a mapped specification in accordance with the disclosed embodiments.

FIG. 5 illustrates another example of a graphical user interface used to present a mapped specification 350 in accordance with the disclosed embodiments. The mapped specification 350 includes the layout/assets 361, 363, 365, 367 from the design document 211, and on page references 360, 362, 364, 366, 368 that indicate the corresponding mappings to design system components/definitions (that were pulled from the library file 207). For instance, reference 362 maps an image in the design system to the image 361; reference 366 maps a visual picker in the design system to the UI element 365; reference 364 maps a variable in the design system to the UI element 363. As such, the mapped specification 350 displays mapping between different assets/layout from the design document file and corresponding design system components that are part of the library file.

Referring again to FIG. 2, at 226, the UI design system mapping platform 130 exports the mapped specification (i.e., having the assigned document-to-library mappings of document features to the design system components) to the development platform 140. At 228, developers can access and utilize the exported specifications for reference purposes as a development guide. The mapped specification can be a visualized representation (e.g., images, HTML pages) of the design document file that provides the developer with instructions on how to implement the design document file during development. This better prepares developers for UI design implementation by directly matching current design system components to the layout and assets specified in the design document file.

Figure 6:
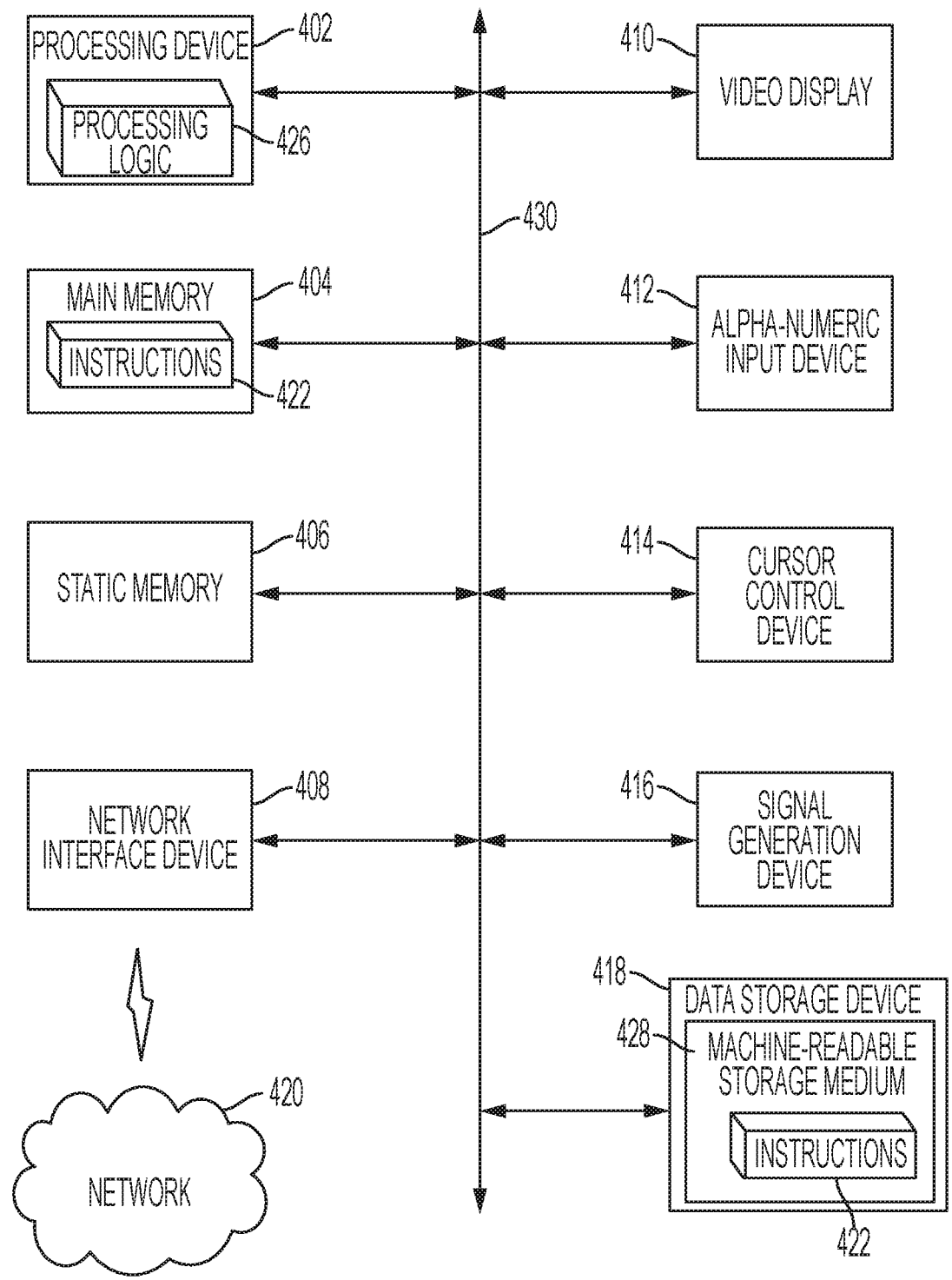
FIG. 6 illustrates a diagrammatic representation of a machine in the exemplary form of a computer system within which a set of instructions, for causing the machine to perform any one or more of the methodologies discussed herein, may be executed.

FIG. 6 illustrates a diagrammatic representation of a machine in the exemplary form of a computer system 400 within which a set of instructions, for causing the machine to perform any one or more of the methodologies discussed herein, may be executed. The system 400 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 418, which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable medium 428 on which is stored one or more sets of instructions 422 (e.g., instructions of in-memory buffer service 44) embodying any one or more of the methodologies or functions described herein. The instructions 422 may also reside, completely or at least partially, within the main memory 404 and/or within processing logic 426 of the processing device 402 during execution thereof by the computer system 400, the main memory 404 and the processing device 402 also constituting computer-readable media. The instructions may further be transmitted or received over a network 420 via the network interface device 408.

While the computer-readable storage medium 428 is shown in an exemplary embodiment to be a single medium, the term "computer-readable storage medium" should be taken to include a single medium or multiple media (e.g., a centralized or distributed database) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method, comprising:
    exporting, from a design system to a user interface (UI) design system mapping platform, a library file comprising: design system components for development reuse and their definitions, wherein the design system components can be assembled to build user interfaces, applications or layouts;
    generating, at a design tool configured to access the design system, a design document file based on selected ones of the design system components, wherein the design document file uses naming conventions and patterns of the design tool, wherein the design document file comprises design artifacts including: layout and assets that describe a user interface of an application, wherein the layout comprises information or elements that define a structure for a user interface, and wherein the assets are resources or components used to implement a design artifact in the user interface;
    sending the design document file to the UI design system mapping platform; and
    automatically generating, at the UI design system mapping platform based on the library file and the design document file, a mapped specification that maps the design document file to the library file, wherein the mapped specification includes naming conventions of the design system, wherein the mapped specification is a visualized representation with instructions that match the design system components to the layout and assets specified in the design document file and provides a visual indication of how to implement the design system components within the layout specified in the design document file during development of the user interface of the application.

2. The method according to claim 1, wherein automatically generating, comprises:
    automatically mapping, via the UI design system mapping platform, certain ones of the design system components from the library file to corresponding ones of the design artifacts of the design document file to generate the mapped specification.

3. The method according to claim 1, further comprising:
    interpreting, at the UI design system mapping platform, layout organization specified by the design document file to setup naming and ordering of: layers, groups and names within the design document file; and
    mapping, at the UI design system mapping platform, the naming and the ordering to the certain ones of the design system components.

4. The method according to claim 1, further comprising:
    configuring, based on inputs to the UI design system mapping platform, features of the library file prior to automatically generating the mapped specification;
    automatically mapping, via the UI design system mapping platform, the design document file to the library file to generate documentation that includes the design system components mapped to the design artifacts,
    selecting, based on inputs to the UI design system mapping platform, which portions of documentation are to be included as part of and used to generate the mapped specification prior to generation of the mapped specification, and wherein the mapped specification comprises: at least some of the documentation with assigned mappings created by the UI design system mapping platform, wherein the assigned mappings map the certain ones of the design system components and usage definitions for those design system components from the library file to the layout and the assets from the design document file.

5. The method according to claim 1, wherein the mapped specification comprises one or more of: a web page, a PDF document, and other file types.

6. The method according to claim 1, wherein the mapped specification is used as a guide during code development, and further comprising:
exporting, from the UI design system mapping platform, the mapped specification to a development platform that is used by developers to develop code for the user interface of the application.

7. The method according to claim 1, the design system comprises: a master database that is configured to store the design system components for development reuse and their definitions; and an export service, and wherein exporting, from the design system to the US design system mapping platform, the library file comprises:
packaging, via the export service, the design system components and their definitions into the library file; and
communicating the library file to the UI design system mapping platform.

8. A system, comprising:
a design system configured to store design system components for development reuse and their definitions in a library file, wherein the design system components can be assembled to build user interfaces, applications or layouts;
a design tool configured to access the design system and generate a design document file based on selected ones of the design system components, wherein the design document file uses naming conventions and patterns of the design tool, wherein the design document file comprises design artifacts including: layout and assets that describe a user interface of an application, wherein the layout comprises information or elements that define a structure for a user interface, and wherein the assets are resources or components used to implement a design artifact in the user interface; and
a user interface (UI) design system mapping platform configured to automatically generate, based on the library file and the design document file, a mapped specification that maps the design document file to the library file, wherein the mapped specification includes naming conventions of the design system, wherein the mapped specification is a visualized representation with instructions that match the design system components to the layout and assets specified in the design document file and provides a visual indication of how to implement the design system components within the layout specified in the design document file during development of the user interface of the application.

9. The system according to claim 8, wherein the UI design system mapping platform is configured to: automatically generate the mapped specification by mapping certain ones of the design system components from the library file to corresponding ones of the design artifacts of the design document file to automatically map the design document file to the library file.

10. The system according to claim 8, wherein the UI design system mapping platform is configured to:
interpret layout organization specified by the design document file to setup naming and ordering of: layers, groups and names within the design document file; and
map the naming and the ordering to the certain ones of the design system components.

11. The system according to claim 8, wherein a user of the UI design system mapping platform is allowed to configure features of the library file prior to generation of the mapped specification,
wherein the UI design system mapping platform is configured to: automatically map the design document file to the library file to generate documentation that includes the design system components mapped to the design artifacts,
wherein the user of the UI design system mapping platform is allowed to select which portions of documentation are to be included as part of and used to generate the mapped specification prior to generation of the mapped specification, and
wherein the mapped specification comprises: at least some of the documentation with assigned mappings created by the UI design system mapping platform, wherein the assigned mappings map the certain ones of the design system components and usage definitions for those design system components from the library file to the layout and the assets from the design document file.

12. The system according to claim 8, wherein the mapped specification comprises one or more of: a web page, a PDF document, and other file types.

13. The system according to claim 8, wherein the mapped specification is used as a guide during code development, and wherein the UI design system mapping platform is configured to:
export the mapped specification to a development platform that is used by developers to develop code for the user interface of the application.

14. The system according to claim 8, wherein the design system comprises:
a master database that is configured to store the design system components for development reuse and their definitions; and
an export service that is configured to: package the design system components and their definitions into the library file, and communicate the library file to the UI design system mapping platform.

15. A non-transitory, computer-readable medium containing instructions for computer program thereon, which, when executed by a processor of a user interface (UI) design system mapping platform, are configurable to perform a method, comprising:
importing, from a design system to the UI design system mapping platform, a library file comprising: design system components for development reuse and their definitions, wherein the design system components can be assembled to build user interfaces, applications or layouts;
importing, from a design tool to the UI design system mapping platform, a design document file that was generated based on selected ones of the design system components, wherein the design document file uses naming conventions and patterns of the design tool, wherein the design document file comprises design artifacts including: layout and assets that describe a user interface of an application, wherein the layout comprises information or elements that define a structure for a user interface, and wherein the assets are resources or components used to implement a design artifact in the user interface; and
automatically generating, at the UI design system mapping platform based on the library file and the design document file, a mapped specification that maps the design document file to the library file, wherein the mapped specification includes naming conventions of the design system, wherein the mapped specification is a visualized representation with instructions that match the design system components to the layout and assets specified in the design document file and provides a visual indication of how to implement the design system components within the layout specified in the design document file during development of the user interface of the application.

16. The non-transitory, computer-readable medium according to claim 15, wherein automatically generating, comprises:
   automatically mapping, via the UI design system mapping platform, certain ones of the design system components from the library file to corresponding ones of the design artifacts of the design document file to generate the mapped specification.

17. The non-transitory, computer-readable medium according to claim 15, wherein the method further comprises:
   interpreting, at the UI design system mapping platform, layout organization specified by the design document file to setup naming and ordering of: layers, groups and names within the design document file; and
   mapping, at the UI design system mapping platform, the naming and the ordering to the certain ones of the design system components.

* * * * *